US012724664B2

(12) United States Patent
Lin et al.

(10) Patent No.: US 12,724,664 B2
(45) Date of Patent: Sep. 1, 2026

(54) DECODING METHOD, MEMORY STORAGE DEVICE AND MEMORY CONTROL CIRCUIT UNIT

(71) Applicant: PHISON ELECTRONICS CORP., Miaoli (TW)

(72) Inventors: Yu-Hsiang Lin, Yunlin County (TW); Shih-Jia Zeng, Hsinchu City (TW)

(73) Assignee: PHISON ELECTRONICS CORP., Miaoli (TW)

( * ) Notice: Subject to any disclaimer, the term of this patent is extended or adjusted under 35 U.S.C. 154(b) by 61 days.

(21) Appl. No.: 18/490,762

(22) Filed: Oct. 20, 2023

(65) Prior Publication Data

US 2025/0068509 A1 Feb. 27, 2025

(30) Foreign Application Priority Data

Aug. 24, 2023 (TW) ................................ 112131966

(51) Int. Cl.
*G06F 11/10* (2006.01)

(52) U.S. Cl.
CPC .................................. *G06F 11/10* (2013.01)

(58) Field of Classification Search
CPC ...................................................... G06F 11/10
USPC ....................................................... 714/763
See application file for complete search history.

(56) References Cited

U.S. PATENT DOCUMENTS 7,116,618 B2 * 10/2006 Okazaki ................. G11B 20/12
11,531,589 B1 * 12/2022 Lin ..................... G06F 11/1048
11,669,394 B2 * 6/2023 Chang ................. G06F 11/0772 714/764
11,768,732 B2 * 9/2023 Kumano ............. G06F 11/1048 714/764
11,784,665 B2 * 10/2023 Imaizumi .......... H03M 13/2909 714/764
2011/0219284 A1 * 9/2011 Uchikawa ............. G11C 29/52 714/763
2014/0068379 A1 * 3/2014 Sakaue ................... G06F 11/10 714/764

(Continued)

FOREIGN PATENT DOCUMENTS

TW 202211037 3/2022
TW 202311950 3/2023

OTHER PUBLICATIONS

"Office Action of Taiwan Counterpart Application", issued on May 3, 2024, p. 1-p. 9.

*Primary Examiner* — James C Kerveros
(74) *Attorney, Agent, or Firm* — JCIPRNET

(57) ABSTRACT

A decoding method, a memory storage device, and a memory control circuit unit are provided. The decoding method is described below. A read command sequence is transmitted, the read command sequence instructs to read a first physical unit, and the first physical unit belongs to a physical unit group. A first single-frame decoding is performed on a first data frame read from the first physical unit. First error evaluation information corresponding to the physical unit group is obtained in response to the first single-frame decoding being failed and a default condition not being satisfied. This default condition is used for triggering the multi-frame decoding on the physical unit group. A second single-frame decoding is performed on the first data frame according to the first error evaluation information.

24 Claims, 11 Drawing Sheets

(56) References Cited

U.S. PATENT DOCUMENTS

2014/0223263 A1* 8/2014 Sakurada ............ G06F 11/1008
714/773
2015/0188577 A1* 7/2015 Ogawa ................ G06F 11/1012
714/759
2015/0222291 A1* 8/2015 Kokubun ........... H03M 13/1142
714/764
2016/0034354 A1* 2/2016 Hashimoto ........... G06F 3/0683
714/764
2020/0371867 A1* 11/2020 Imaizumi ............ G06F 11/1032
2023/0075492 A1* 3/2023 Kaneko ................. G06F 3/0619
2023/0298685 A1* 9/2023 Shimizu ............. H03M 13/1125
365/189.05
2025/0068511 A1* 2/2025 Shin ........................ G06F 11/10

* cited by examiner

1101

| Voltage range | A | B | C | D | E | F |
| --- | --- | --- | --- | --- | --- | --- |
| LLR(0) | −11 | −6 | −3 | 3 | 6 | 11 |
| LLR(1) | −8 | −4 | −2 | 2 | 4 | 8 |
| LLR(2) | −7 | −3 | −1 | 1 | 3 | 7 |

<--- M=M(1)
<--- M=M(2)
<--- M=M(3)

DECODING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 112131966, filed on Aug. 24, 2023. The entirety of the above-mentioned patent application is hereby incorporated by reference herein and made a part of this specification.

BACKGROUND

Technical Field

The disclosure relates to a decoding technology, and more particularly, to a decoding method, a memory storage device, and a memory control circuit unit.

Description of Related Art

The rapid growth of portable electronic devices such as mobile phones and laptops in recent years has led to a rapid increase in consumer demand for storage media. Since a rewritable non-volatile memory module (e.g., a flash memory) has the characteristics of data non-volatility, power saving, small size, and having no mechanical structure, it is very suitable for being built in a variety of portable electronic devices as exemplified above.

Some memory storage devices support single-frame decoding for a single data frame and multi-frame decoding for multiple data frames. For example, in general, errors in a single data frame can be corrected by single-frame decoding. When a single-frame decoding fails due to a large number of error bits in a particular data frame, the error in the target data frame can be further corrected by multi-frame decoding with other data frames in the same encoding group. However, once there are too many data frames in the same encoding group that cannot be corrected by single-frame decoding, then the multi-frame decoding for this encoding group cannot guarantee that the errors in the target data frame are completely corrected, resulting in a decrease in decoding efficiency.

SUMMARY

The disclosure provides a decoding method, a memory storage device, and a memory control circuit unit, which can improve decoding efficiency.

An exemplary embodiment of the disclosure provides a decoding method for a rewritable non-volatile memory module. The rewritable non-volatile memory module includes multiple physical units. The decoding method is described below. A read command sequence is transmitted. The read command sequence instructs to read a first physical unit in the physical units, and the first physical unit belongs to a physical unit group. A first single-frame decoding is performed on a first data frame read from the first physical unit. First error evaluation information corresponding to the physical unit group is obtained in response to the first single-frame decoding being failed and a default condition not being satisfied. The default condition is used for triggering a multi-frame decoding on the physical unit group, and the first error evaluation information is related to a bit error rate of the physical unit group. A second single-frame decoding is performed on the first data frame according to the first error evaluation information.

The exemplary embodiment of the disclosure further provides a memory storage device, which includes a connection interface unit, a rewritable non-volatile memory module, and a memory control circuit unit. The connection interface unit is used for coupling to a host system. The rewritable non-volatile memory module includes multiple physical units. The memory control circuit unit is coupled to the connection interface unit and the rewritable non-volatile memory module. The memory control circuit unit is used to perform the following. A read command sequence is transmitted. The read command sequence instructs to read a first physical unit in the physical units, and the first physical unit belongs to a physical unit group. A first single-frame decoding is performed on a first data frame read from the first physical unit. First error evaluation information corresponding to the physical unit group is obtained in response to the first single-frame decoding being failed and a default condition not being satisfied. The default condition is used for triggering a multi-frame decoding on the physical unit group, and the first error evaluation information is related to a bit error rate of the physical unit group. A second single-frame decoding is performed on the first data frame according to the first error evaluation information.

An exemplary embodiment of the disclosure further provides a memory control circuit unit for controlling a rewritable non-volatile memory module. The rewritable non-volatile memory module includes multiple physical units. The memory control circuit unit includes a host interface, a memory interface, a decoding circuit, and a memory management circuit. The host interface is used for coupling to a host system. The memory interface is used for coupling to the rewritable non-volatile memory module. The memory management circuit is coupled to the host interface, the memory interface, and the decoding circuit. The memory management circuit is used for transmitting a read command sequence. The read command sequence instructs to read a first physical unit in the physical units, and the first physical unit belongs to a physical unit group. The decoding circuit is used for performing a first single-frame decoding on a first data frame read from the first physical unit. The memory management circuit is further used for obtaining first error evaluation information corresponding to the physical unit group in response to the first single-frame decoding being failed and a default condition not being satisfied. The default condition is used for triggering a multi-frame decoding on the physical unit group, and the first error evaluation information is related to a bit error rate of the physical unit group. The decoding circuit is further used for performing a second single-frame decoding on the first data frame according to the first error evaluation information.

Based on the above, after transmitting the read command sequence instructing to read the first physical unit in a physical unit group, the first single-frame decoding may be performed on the first data frame read from the first physical unit. Next, the first error evaluation information corresponding to the physical unit group is obtained in response to the first single-frame decoding being failed and a default condition not being satisfied. The default condition is used for triggering a multi-frame decoding on the physical unit group, and the first error evaluation information is related to a bit error rate of the physical unit group. Afterwards, a second single-frame decoding is performed on the first data frame according to the first error evaluation information. Thereby, decoding efficiency may be effectively improved.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system so that the host system may write data to the memory storage device or read data from the memory storage device.

Figure 1:
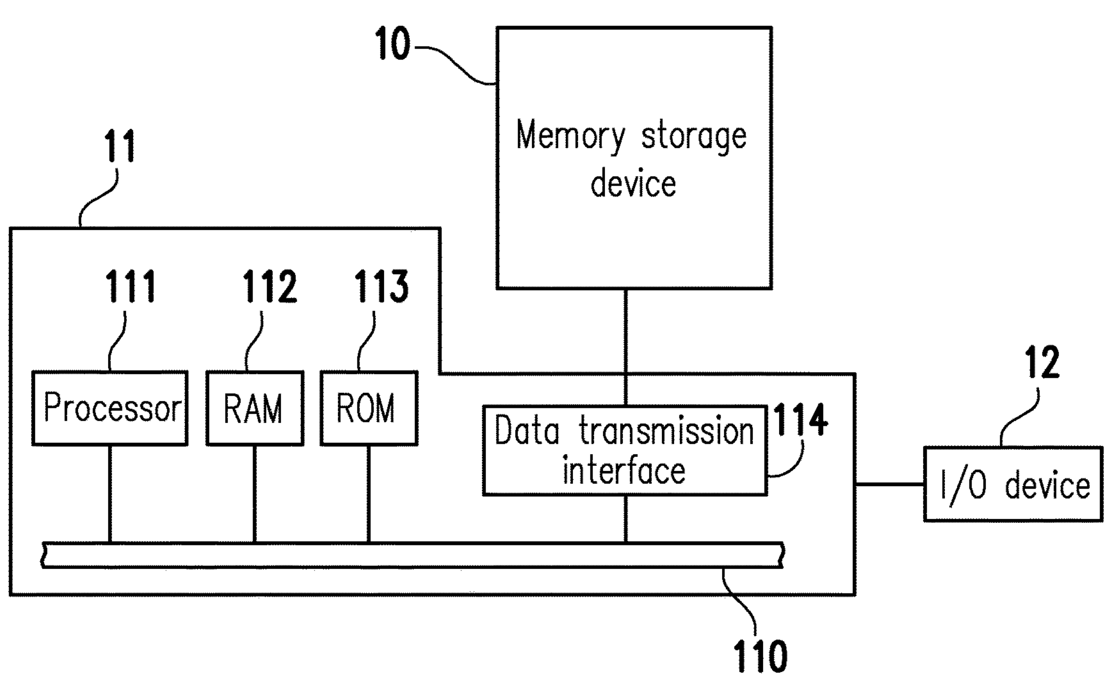
FIG. 1 is a schematic diagram of a host system, a memory storage device, and an input/output (I/O) device according to an exemplary embodiment of the disclosure.
Figure 2:
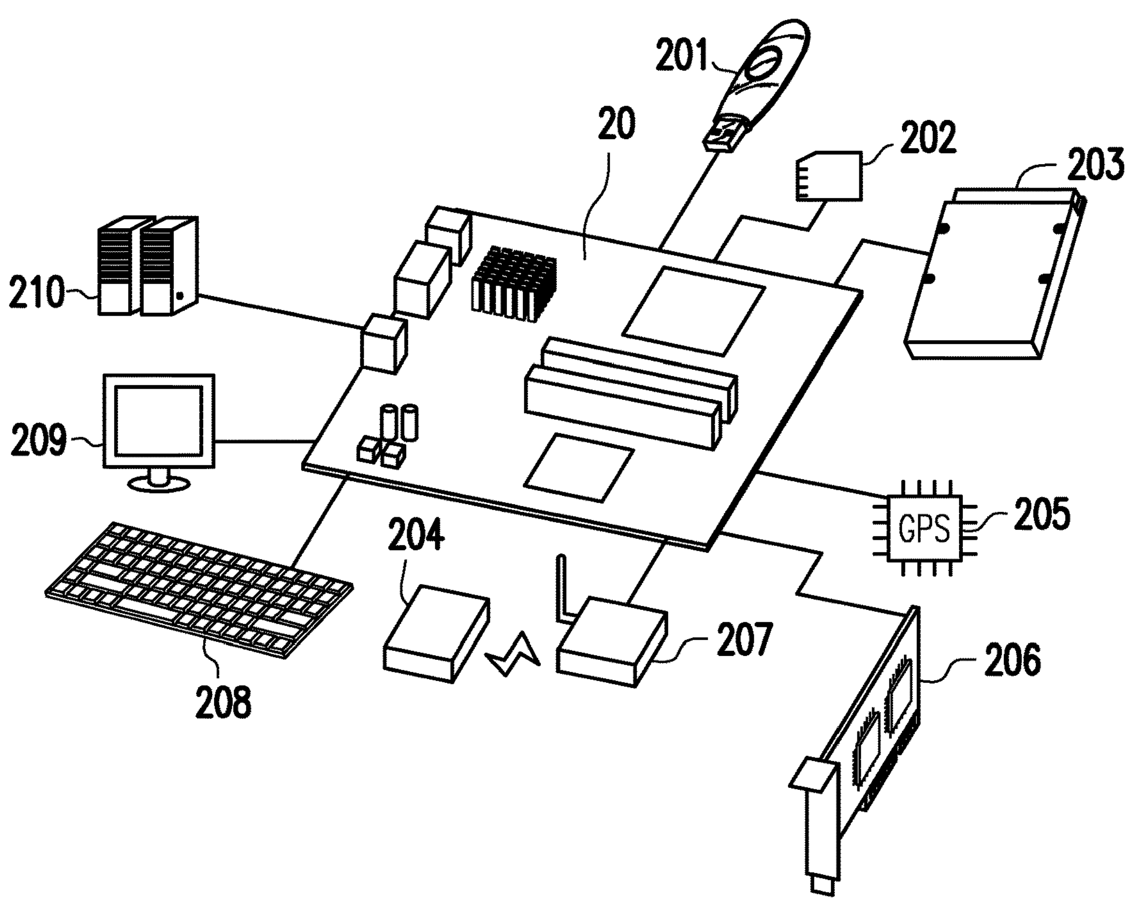
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Referring to FIG. 1 and FIG. 2, a host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In one exemplary embodiment, the host system 11 may be coupled to a memory storage device 10 through the data transmission interface 114. For example, the host system 11 may store data to the memory storage device 10 or read data from the memory storage device 10 via the data transmission interface 114. In addition, the host system 11 may be coupled to an I/O device 12 through the system bus 110. For example, the host system 11 may transmit an output signal to the I/O device 12 or receive an input signal from the I/O device 12 via the system bus 110.

In one exemplary embodiment, the processor 111, the random access memory 112, the read only memory 113, and the data transmission interface 114 may be provided on a main board 20 of the host system 11. The number of the data transmission interface 114 may be one or more. The main board 20 may be coupled to the memory storage device 10 through the data transmission interface 114 via a wired or wireless connection.

In one exemplary embodiment, the memory storage device 10 may be, for example, a flash drive 201, a memory card 202, a solid state drive (SSD) 203, or a wireless memory storage device 204. The wireless memory storage device 204 may be a memory storage device based on various wireless communication technologies, such as a near field communication (NFC) memory storage device, a wireless fax (WiFi) memory storage device, a Bluetooth memory storage device, a low power Bluetooth memory storage device (e.g., iBeacon), etc. In addition, the main board 20 may also be coupled to various I/O devices, such as a global positioning system (GPS) module 205, a network interface card 206, a wireless transmission device 207, a keyboard 208, a screen 209, a speaker 210, etc., through the system bus 110. For example, in one exemplary embodiment, the main board 20 may access the wireless memory storage device 204 through the wireless transmission device 207.

In one exemplary embodiment, the host system 11 is a computer system. In one exemplary embodiment, the host system 11 may be any system that may substantially cooperate with a memory storage device to store data. In one exemplary embodiment, the memory storage device 10 and the host system 11 may respectively include the memory storage device 30 and the host system 31 in FIG. 3.

Figure 3:
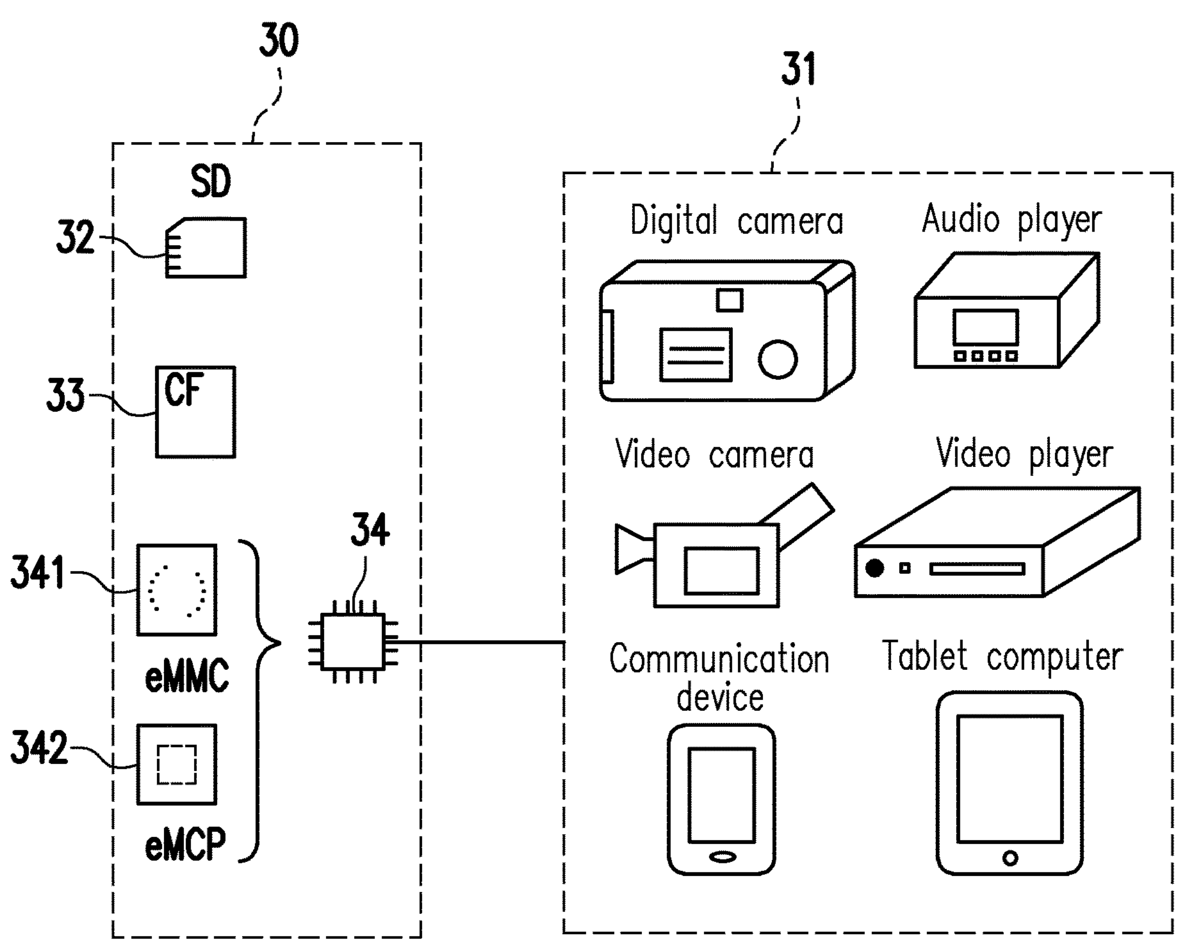
FIG. 3 is a schematic diagram of a host system and a memory storage device according to an exemplary embodiment of the disclosure.

FIG. 3 is a schematic diagram of a host system and a memory storage device according to an exemplary embodiment of the disclosure. Referring to FIG. 3, the memory storage device 30 may be used in conjunction with the host system 31 to store data. For example, the host system 31 may be a digital camera, a video camera, a communication device, an audio player, a video player, or a tablet computer system. For example, the memory storage device 30 may be various non-volatile memory storage devices, such as a secure digital (SD) card 32, a compact flash (CF) card 33, or an embedded storage device 34, etc., used in the host system 31. The embedded storage device 34 includes various embedded storage devices that directly couple a memory module to a substrate of the host system, such as an embedded multi media card (eMMC) 341 and/or an embedded multi chip package (eMCP) storage device 342, etc.

Figure 4:
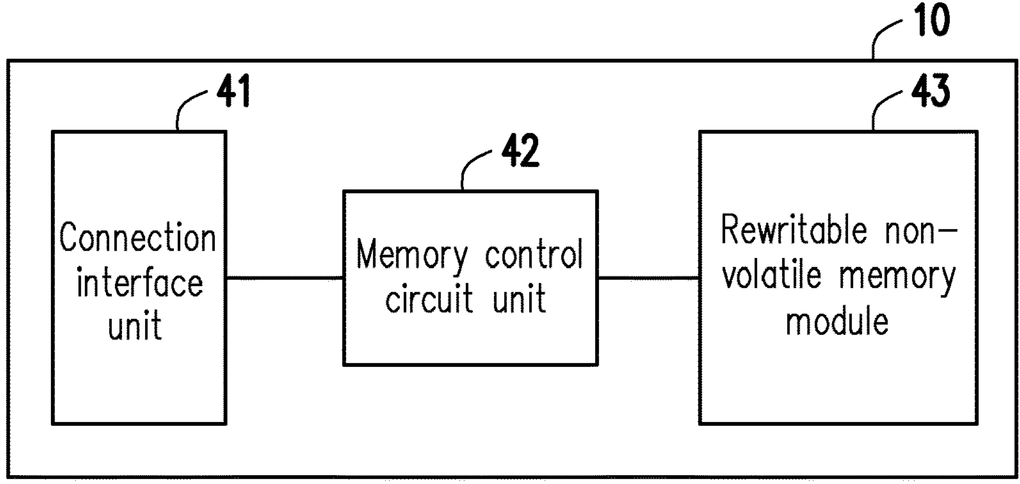
FIG. 4 is a schematic diagram of a memory storage device according to an exemplary embodiment of the disclosure.

FIG. 4 is a schematic diagram of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is used for coupling the memory storage device 10 to the host system 11. The memory storage device 10 can communicate with the host system 11 via the connection interface unit 41. In one exemplary embodiment, the connection interface unit 41 is compatible with the Peripheral Component Interconnect Express (PCI Express) standard. In one exemplary embodiment, the connection interface unit 41 may also be compliant to the serial advanced technology attachment (SATA) standard, the parallel advanced technology attachment (PATA) standard, the institute of electrical and electronics engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 may be packaged in one chip with the memory control circuit unit 42, or the connection interface unit 41 may be provided outside a chip including the memory control circuit unit 42.

The memory control circuit unit 42 is coupled to the connection interface unit 41 and the rewritable non-volatile memory module 43. The memory control circuit unit 42 is configured to execute multiple logic gates or control commands implemented in a hardware form or a firmware form and to perform operations such as writing, reading, and erasing of data in the rewritable non-volatile memory module 43 according to the commands of the host system 11.

The rewritable non-volatile memory module 43 is used for storing the data written by the host system 11. The rewritable non-volatile memory module 43 may include a single level cell (SLC) NAND-type flash memory module (i.e., a flash memory that can store 1 bit in one memory cell), multi level cell (MLC) NAND-type flash memory module (i.e., a flash memory module that can store 2 bits in one memory cell), a triple level cell (TLC) NAND-type flash memory module (i.e., a flash memory module that can store 3 bits in one memory cell), a quad level cell (QLC) NAND-type flash memory module (i.e., a flash memory module that can store 4 bits in one memory cell), other flash memory modules, or other memory modules with the same characteristics.

Each memory cell in the rewritable non-volatile memory module 43 stores one or more bits by a change in a voltage (also referred to as a threshold voltage hereinafter). Specifically, there is a charge trapping layer between a control gate and a channel of each of the memory cells. By applying a write voltage to the control gate, the amount of electrons in the charge trapping layer may be changed, thereby changing the threshold voltage of the memory cell. This operation of changing the threshold voltage of the memory cell is also referred to as "writing data to the memory cell" or "programming the memory cell". As the threshold voltage changes, each of the memory cells in the rewritable non-volatile memory module 43 has multiple storage statuses. By applying a read voltage, it can be determined which storage status a memory cell belongs to, thereby obtaining the one or more bits stored in the memory cell.

In one exemplary embodiment, the memory cells of the rewritable non-volatile memory module 43 may configure multiple physical programming units, and the physical programming units may configure multiple physical erasing units. Specifically, memory cells on the same word line may form one or more physical programming units. If each memory cell can store two or more bits, the physical programming units on the same word line may be classified at least as lower physical programming units and upper physical programming units. For example, the least significant bit (LSB) of one memory cell belongs to the lower physical programming unit, and the most significant bit (MSB) of one memory cell belongs to the upper physical programming unit. Generally, in an MLC NAND flash memory, the write speed of the lower physical programming unit is greater than the write speed of the upper physical programming unit, and/or the reliability of the lower physical programming unit is higher than the reliability of the upper physical programming unit.

In one exemplary embodiment, the physical programming unit is the minimum unit for programming. That is, the physical programming unit is the minimum unit for writing data. For example, the physical programming unit may be a physical page or a physical sector. If the physical programming unit is a physical page, then the physical programming unit may include a data bit area and a redundancy bit area. The data bit area includes multiple physical sectors and is used for storing user data, and the redundancy bit area is used for storing system data (e.g., management data such as error correcting codes). In one exemplary embodiment, the data bit area includes 32 physical sectors, and the size of one physical sector is 512 bytes (B). However, in other exemplary embodiments, the data bit area may also include 8, 16, or a greater or lesser number of physical sectors, and the size of each of the physical sectors may also be larger or smaller. On the other hand, the physical erasing unit is the minimum unit for erasing. That is, each of the physical erasing units includes the smallest number of memory cells to be erased together. For example, the physical erasing unit is a physical block.

Figure 5:
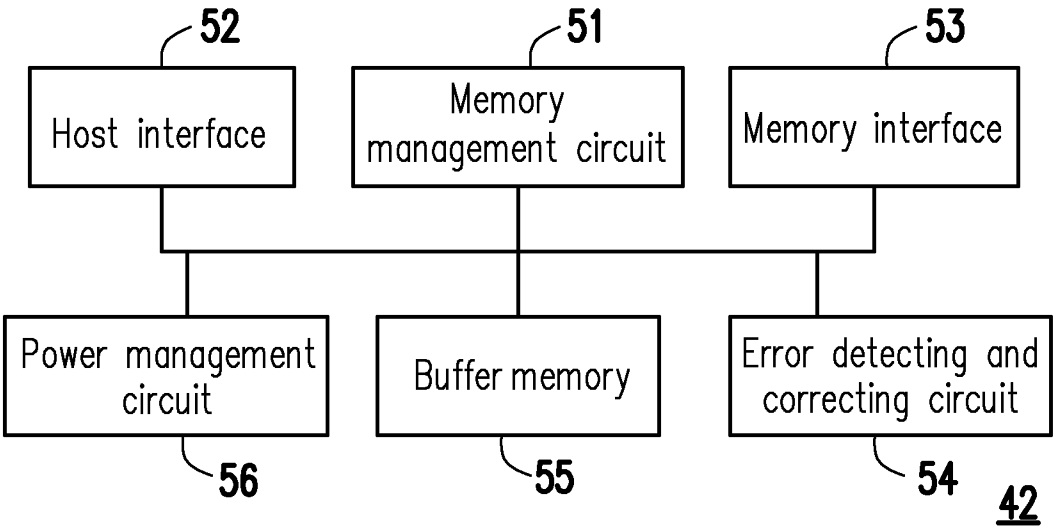
FIG. 5 is a schematic diagram of a memory control circuit unit according to an exemplary embodiment of the disclosure.

FIG. 5 is a schematic diagram of a memory control circuit unit according to an exemplary embodiment of the disclosure. Referring to FIG. 5, the memory control circuit unit 42 includes a memory management circuit 51, a host interface 52, a memory interface 53, and an error detecting and correcting circuit 54.

The memory management circuit 51 is used to control the overall operation of the memory control circuit unit 42. Specifically, the memory management circuit 51 has multiple control commands, and when the memory storage device 10 operates, the control commands are executed to perform operations such as writing, reading, and erasing of data. The following description of the operation of the memory management circuit 51 is equivalent to the description of the operation of the memory control circuit unit 42.

In one exemplary embodiment, the control commands of the memory management circuit 51 are implemented in a firmware form. For example, the memory management circuit 51 has a microprocessor unit (not shown) and a read only memory (not shown), and the control commands are programmed into this read only memory. When the memory storage device 10 operates, the control commands are executed by the microprocessor unit to perform operations such as writing, reading, and erasing of data.

In one exemplary embodiment, the control commands of the memory management circuit 51 may also be stored in a specific area of the rewritable non-volatile memory module 43 (e.g., a system area dedicated to storing system data in the memory module) in a program code form. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes this boot code to load the control commands stored in the rewritable non-volatile memory module 43 into the random access memory of the memory management circuit 51. Afterwards, the microprocessor unit runs these control commands to perform operations such as writing, reading, and erasing of data.

In one exemplary embodiment, the control commands of the memory management circuit 51 may also be implemented in a hardware form. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is used for managing the memory cells or a memory cell group of the rewritable non-volatile memory module 43. The memory writing circuit is used for issuing a write command sequence to the rewritable non-volatile memory module 43 to write data into the rewritable non-volatile memory module 43. The memory reading circuit is used for issuing a read command sequence to the rewritable non-volatile memory module 43 to read data from the rewritable non-volatile memory module 43. The memory erasing circuit is used for issuing an erase command sequence to the rewritable non-volatile memory module 43 to erase data from the rewritable non-volatile memory module 43. The data processing circuit is used for processing the data to be written into the rewritable non-volatile memory module 43 and the data read from the rewritable non-volatile memory module 43. The write command sequence, the read command sequence, and the erase command sequence may respectively include one or more program codes or command codes for instructing the rewritable non-volatile memory module 43 to perform corresponding writing, reading, and erasing operations. In one exemplary embodiment, the memory management circuit 51 may also issue other types of command sequences to instruct the rewritable non-volatile memory module 43 to perform corresponding operations.

The host interface 52 is coupled to the memory management circuit 51. The memory management circuit 51 may communicate with the host system 11 through the host interface 52. The host interface 52 may be used for receiving and identifying the commands and data transmitted by the host system 11. For example, the commands and data transmitted by the host system 11 may be transmitted to the memory management circuit 51 through the host interface 52. In addition, the memory management circuit 51 may transmit data to the host system 11 through the host interface 52. In this exemplary embodiment, the host interface 52 is compatible with the PCI Express standard. However, it should be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used for accessing the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable to the rewritable non-volatile memory module 43 via the memory interface 53. Specifically, if the memory management circuit 51 is to access the rewritable non-volatile memory module 43, the memory interface 53 transmits a corresponding command sequence. For example, the command sequences may include a write command sequence to instruct data writing, a read command sequence to instruct data reading, an erase command sequence to instruct data erasing, and corresponding command sequences for instructing various memory operations (e.g., changing the read voltage level, executing a garbage collection (GC) operation, etc.). These command sequences are, for example, generated by the memory management circuit 51 and transmitted to the rewritable non-volatile memory module 43 via the memory interface 53. These command sequences may include one or more signals or data on the bus. The signals or data may include command codes or program codes. For example, the read command sequence includes information such as the read identification code, the memory address, etc.

The error detecting and correcting circuit 54 is coupled to the memory management circuit 51 and is configured to perform an error detecting and correcting operation to ensure the correctness of the data. Specifically, when the memory management circuit 51 receives a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code to the rewritable non-volatile memory module 43. Afterwards, when the memory management circuit 51 reads data from the rewritable non-volatile memory module 43, it simultaneously reads the error correcting code and/or the error detecting code corresponding to this data, and the error detecting and correcting circuit 54 performs the error detecting and correcting operation on the read data according to this error correcting code and/or error detecting code. For example, the error detecting and correcting circuit 54 may support various encoding/decoding algorithms such as low density parity check code (LDPC code), BCH code, Reed-Solomon code (RS code), Exclusive OR (XOR) code, etc.

The basic unit for the error detecting and correcting circuit 54 to perform encoding/decoding is one frame (also referred to as a data frame). One frame may include multiple data bits. In one exemplary embodiment, one frame includes 256 bits. However, in another exemplary embodiment, one frame may also include more (e.g., 4K bytes) or fewer bits.

The error detecting and correcting circuit 54 may perform a single-frame encoding and decoding on data in a single frame, and the error detecting and correcting circuit 54 may also perform a multi-frame encoding and decoding on data in multiple frames. In one exemplary embodiment, the error detecting and correcting circuit 54 performs the single-frame encoding and decoding based on the LDPC code, and the disclosure is not limited thereto. In one exemplary embodiment, the error detecting and correcting circuit 54 performs the multi-frame encoding and decoding based on the BCH code, the RS code, and the XOR code, and the disclosure is not limited thereto. Depending on the encoding/decoding algorithm employed, the error detecting and correcting circuit 54 may encode the data to be protected to generate a corresponding error correcting code and/or error detecting code. Afterwards, the error correcting code and/or error detecting code generated by encoding may be used to correct the error in the data to be protected. For ease of description, the error correcting code and/or error detecting code generated through encoding will be collectively referred to as parity data below.

In one exemplary embodiment, the memory control circuit unit 42 further includes a buffer memory 55 and a power management circuit 56. The buffer memory 55 is coupled to the memory management circuit 51 and used to temporarily store data. The power management circuit 56 is coupled to the memory management circuit 51 and used to control the power of the memory storage device 10.

In one exemplary embodiment, the rewritable non-volatile memory module 43 in FIG. 4 may include a flash memory module. In one exemplary embodiment, the memory control circuit unit 42 in FIG. 4 may include a flash memory controller. In one exemplary embodiment, the memory management circuit 51 in FIG. 5 may include a flash memory management circuit.

Figure 6:
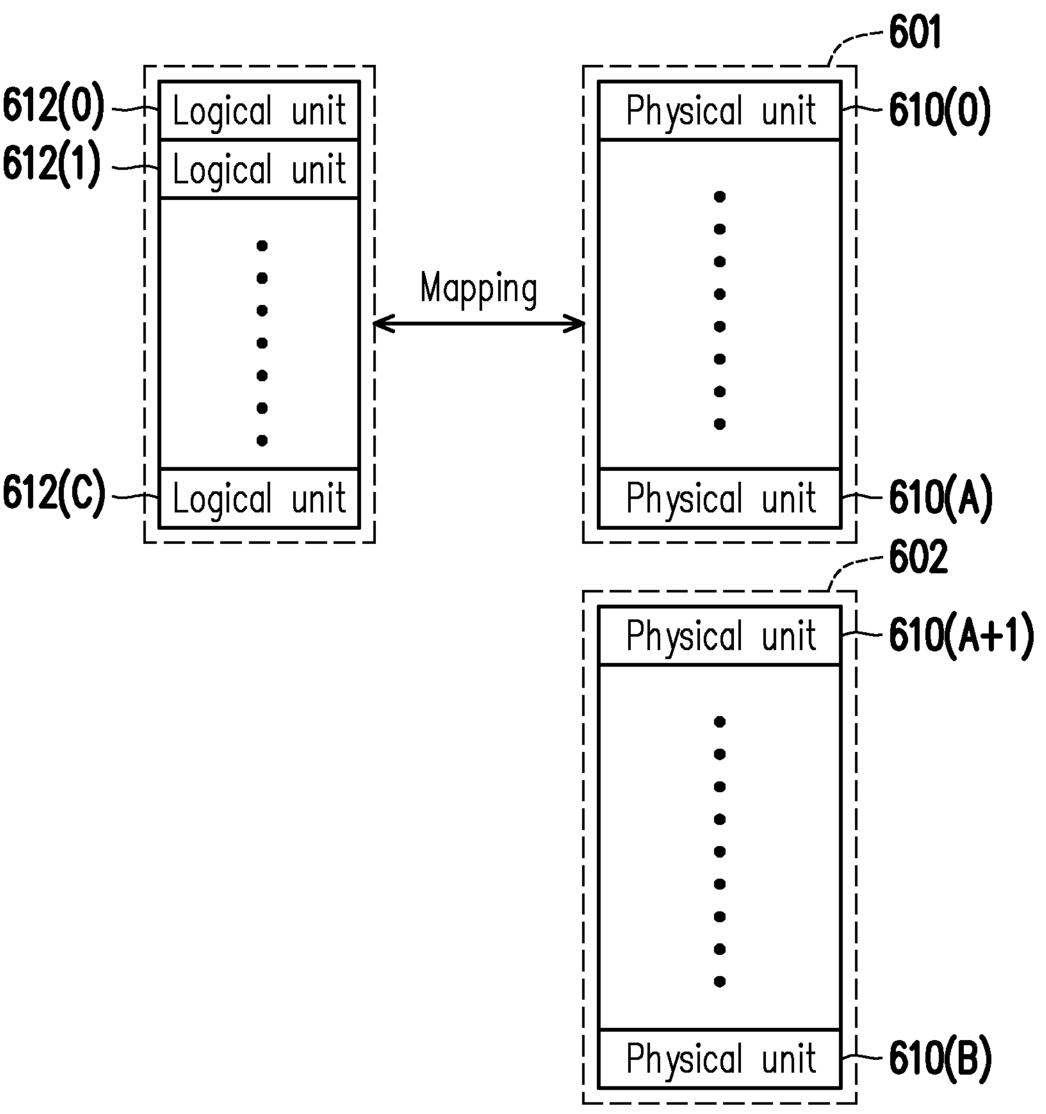
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 51 may logically group the physical units 610(0) to 610(B) in the rewritable non-volatile memory module 43 into a storage area 601 and a spare area 602.

In one exemplary embodiment, one physical unit refers to one physical address or one physical programming unit. In one exemplary embodiment, one physical unit may also be formed by multiple consecutive or non-consecutive physical addresses. In one exemplary embodiment, one physical unit may also refer to one virtual block (VB). One virtual block may include multiple physical addresses or multiple physical programming units. In one exemplary embodiment, one virtual block may also include one or more physical erasing units.

The physical units 610(0) to 610(A) in the storage area 601 are used for storing user data (e.g., user data from the host system 11 in FIG. 1). For example, the physical units 610(0) to 610(A) in the storage area 601 may store valid data and invalid data. The physical units 610(A+1) to 610(B) in the spare area 602 do not store data (e.g., valid data). For example, if a certain physical unit does not store valid data, this physical unit may be associated (or added) to the spare area 602. In addition, the physical units in the spare area 602 (or the physical units not storing valid data) may be erased. When new data is written, one or more physical units may be extracted from the spare area 602 to store this new data. In one exemplary embodiment, the spare area 602 is also referred to as a free pool.

The logical units 612(0) to 612(C) may be configured in the memory management circuit 51 to map the physical units 610(0) to 610(A) in the storage area 601. In one exemplary embodiment, each of the logical units corresponds to one logical address. For example, one logical address may include one or more logical block addresses (LBA) or other logical management units. In one exemplary embodiment, one logical unit may also correspond to one logical programming unit or be configured by multiple consecutive or non-consecutive logical addresses.

It should be noted that one logical unit may be mapped to one or more physical units. If a certain physical unit is currently mapped by a certain logical unit, it means that the data currently stored in this physical unit includes valid data. On the contrary, if a certain physical unit is not currently mapped by any logical unit, it means that the data currently stored in this physical unit is invalid data.

The memory management circuit 51 may record the management data (also referred to as the logical to physical mapping information) describing the mapping relationship between logical units and physical units in at least one logical to physical mapping table. When the host system 11 reads data from the memory storage device 10 or writes data to the memory storage device 10, the memory management circuit 51 may access the rewritable non-volatile memory module 43 according to the information in this logical to physical mapping table.

In one exemplary embodiment, the memory management circuit 51 may use physical unit groups to manage the physical units 610(0) to 610(A). One physical unit group may include multiple physical units. One physical unit group may be used for storing multiple frames. One physical unit may be used for storing one or more frames. One single physical unit group may include physical units on the same (or different) memory plane, the same (or different) memory die, and/or the same (or different) chip enabled (CE) area.

In one exemplary embodiment, the error detecting and correcting circuit 54 may perform the multi-frame encoding on multiple frames stored in a certain physical unit group to protect the data in these frames using the parity data generated by the multi-frame encoding. In addition, the error detecting and correcting circuit 54 may perform the multi-frame decoding on multiple frames read from a certain physical unit group to correct errors in these frames using the parity data generated by the multi-frame encoding.

In one exemplary embodiment, the error detecting and correcting circuit 54 may perform the single-frame encoding on a single frame stored in a certain physical unit to protect the data in this single-frame using the parity data generated by the single-frame encoding. In addition, the error detecting and correcting circuit 54 may perform the single-frame decoding on a single frame read from a certain physical unit to correct the error in this single frame using the parity data generated by the single-frame encoding.

Figure 7:
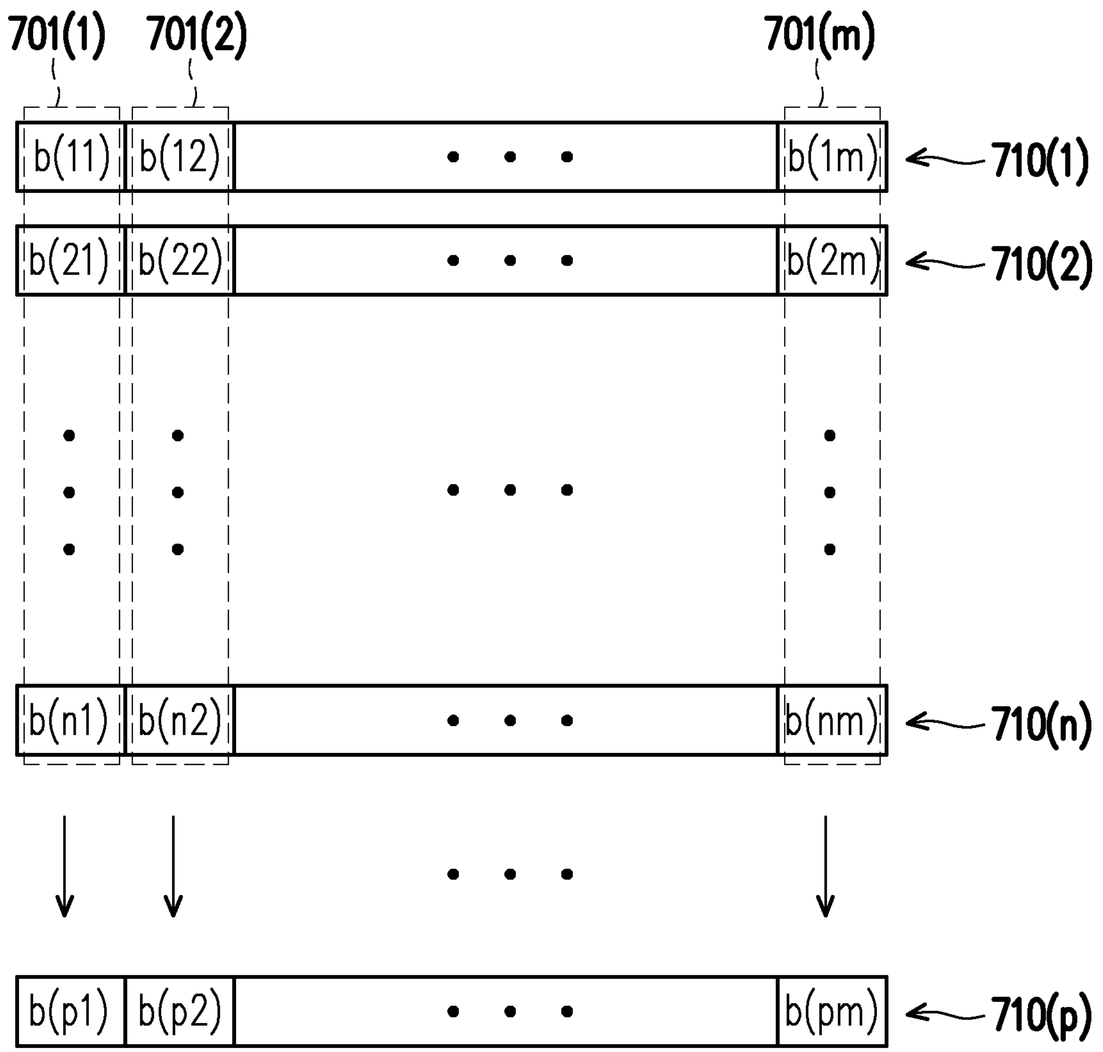
FIG. 7 is a schematic diagram of multi-frame encoding based according to an exemplary embodiment of the disclosure.

FIG. 7 is a schematic diagram of multi-frame encoding based according to an exemplary embodiment of the disclosure. Referring to FIG. 7, frames 710(1) to 710(*n*) includes data stored in a certain physical unit group. For example, this physical unit group may include multiple physical units in FIG. 6. For example, the frame 710(*k*) includes data to be stored in the physical unit 610(*k*), and k is an integer between 1 and n. The data in the frames 710(1) to 710(*n*) may include the data stored instructed by the write command transmitted by the host system 10. Alternatively, the data in the frames 710(1) to 710(*n*) may also include data read from the rewritable non-volatile memory module 43 and waiting to be stored back to the rewritable non-volatile memory module 43.

In one exemplary embodiment, the error detecting and correcting circuit 54 may perform the multi-frame encoding on the frames 710(1) to 710(*n*) to generate the frame 710(*p*). The data in the frame 710(*p*) includes the parity data for protecting the frames 710(1) to 710(*n*). For example, when performing the multi-frame decoding on the frames 710(1) to 710(*n*), the parity data in the frame 710(*p*) may be used for detecting and/or correcting the error in the frames 710(1) to 710(*n*).

In one exemplary embodiment, the multi-frame encoding encodes the data in the frames 710(1) to 710(*n*) based on the location of each bit (or bit group). For example, bits b(11), b(21), . . . , b(n1) at a location 701(1) may be encoded to obtain a bit b(p1) in the frame 710(*p*); bits b(12), b(22), . . . , b(n2) at a location 701(2) may be encoded to obtain a bit b(p2) in the frame 710(*p*); likewise, bits b(1*m*), b (2*m*), . . . , b(nm) at a location 701(*m*) may be encoded to obtain a bit b(pm) in the frame 710(*p*). Afterwards, in the multi-frame decoding, the bits (also referred to as the parity bits) in the frame 710(*p*) may be used for detecting and/or correcting error bits in the frames 710(1) to 710(*n*). For example, the bit b(p2) in the frame 710(*p*) may be used for detecting or correcting one or more error bits at the location 701(2).

It should be noted that, in one exemplary embodiment, the arrangement of the bits covered by any one of the locations 701(1) to 701(*m*) may be different from the arrangement shown in FIG. 7, which is not limited by the disclosure. In addition, in one exemplary embodiment, the number of the frames 710(*p*) including the parity data may also be 2 or more to provide different or better multi-frame decoding capabilities, which is not limited by the disclosure.

In one exemplary embodiment, the error detecting and correcting circuit 54 may perform the single-frame encoding on the frame 710(*j*) in the frames 710(1) to 710(*n*) and 710(*p*) to generate the parity data for protecting the frame 710(*j*), where j is an integer between 1 and n or j may be p. Afterwards, in the single-frame decoding, the parity data generated by performing the single-frame encoding on the frame 710(*j*) may be used for detecting and/or correcting the error bit in the frame 710(*j*).

In one exemplary embodiment, the parity data generated by performing the multi-frame encoding in the frame 710(*p*) is also referred to as a redundant array of independent disks (RAID) error correcting code. In one exemplary embodiment, the frames 710(1) to 710(*n*) and 710(*p*) may also be grouped into one block code. The frames 710(1) to 710(*n*) and 710(*p*) may be stored in multiple physical units belonging to the same physical unit group.

In one exemplary embodiment, the memory management circuit 51 may transmit a read command sequence. This read command sequence may instruct to read a certain physical unit (also referred to as the first physical unit) in a certain physical unit group (also referred to as the first physical unit group). For example, the memory management circuit 51 may transmit this read command sequence to the rewritable non-volatile memory module 43. The rewritable non-volatile memory module 43 may return the data read from the first physical unit to the memory management circuit 51 according to this read command sequence. The decoding circuit in the error detecting and correcting circuit 54 may perform the single-frame decoding on the frame including the data. For example, if the single-frame encoding is performed on the data in this frame based on LDPC code, the decoding circuit may perform the single-frame decoding on this frame based on LDPC code. If the single-frame decoding is successful (which means that the data in this frame is correct and/or the error has been corrected), the error detecting and correcting circuit 54 may output the successfully decoded data.

In one exemplary embodiment, the memory management circuit 51 may receive a read command from the host system 11. This read command may instruct to read the data belonging to a specific logical unit (also referred to as the first logical unit), and the first logical unit is mapped to the first physical unit. According to this read command, the memory management circuit 51 may transmit the read command sequence to the rewritable non-volatile memory module 43 to read the data from the first physical unit.

In one exemplary embodiment, without receiving the read command from the host system 11, the memory management circuit 51 may also actively transmit the read command sequence to the rewritable non-volatile memory module 43 to read the data from the first physical unit. For example, the memory management circuit 51 may actively read the data from the first physical unit when performing the data consolidation operation (e.g., garbage collection operation), performing wear leveling (WL) operation, processing read disturb, and/or processing data retention.

In one exemplary embodiment, if the aforementioned single-frame decoding fails (indicating that this frame is a frame that unable to be corrected by the single-frame decoding), then the decoding circuit in the error detecting and correcting circuit 54 may perform the multi-frame decoding on multiple frames including this frame when the default condition is satisfied. For example, under a situation that the default condition is satisfied, if the multi-frame encoding is performed on this frame originally based on the RS (or XOR) code, then the error detecting and correcting circuit 54 may also perform the multi-frame decoding on this frame based on the RS (or XOR) code. In one exemplary embodiment, a frame that is unable to be corrected by the single-frame decoding is also referred to as a UECC frame.

It should be noted that in the multi-frame decoding based on the RS code, there may only be at most two UECC frames in the frames to be decoded at the same time. If the frames to be decoded include three or more UECC frames at the same time, the multi-frame decoding based on the RS code is unable to correct the errors in these frames. Similarly, in the multi-frame decoding based on the XOR code, there may only be at most one UECC frame in the frames to be decoded at the same time. If the frames to be decoded include two or more UECC frames at the same time, the multi-frame decoding based on the XOR code is unable to correct the errors in these frames.

In one exemplary embodiment, before performing the multi-frame decoding, the memory management circuit 51 may determine whether one default condition is satisfied. This default condition is used for triggering the multi-frame decoding on the first physical unit group. In one exemplary embodiment, in response to this default condition being satisfied, the memory management circuit 51 may instruct the error detecting and correcting circuit 54 to perform the multi-frame decoding on the first physical unit group. In addition, if this default condition is not satisfied, the memory management circuit 51 may prohibit the multi-frame decoding from being performed. This ensures the correctness of the decoding result of the multi-frame decoding performed.

In one exemplary embodiment, the memory management circuit 51 may represent a total number of UECC frames in the first physical unit group by a count value. For example, this count value may be equal to the total number of UECC frames in the first physical unit group. In one exemplary embodiment, in response to this count value reaching (e.g., less than or equal to) a critical value, the memory management circuit 51 may determine that the default condition is satisfied. In addition, if the count value does not reach (e.g., is greater than) this critical value, the memory management circuit 51 may determine that the default condition is not satisfied.

Figure 8:
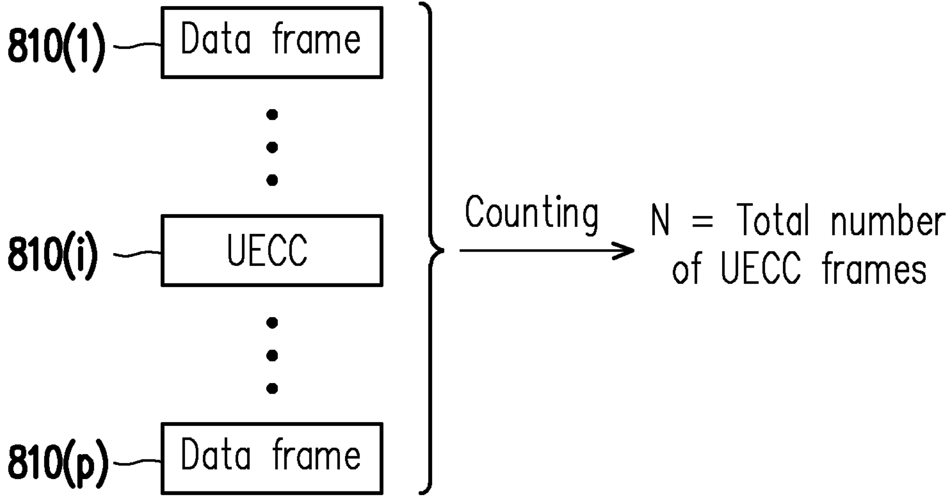
FIG. 8 is a schematic diagram of obtaining a count value representing a total number of UECC frames in a first physical unit group according to an exemplary embodiment of the disclosure.

FIG. 8 is a schematic diagram of obtaining a count value representing a total number of UECC frames in a first physical unit group according to an exemplary embodiment of the disclosure. Referring to FIG. 8, multiple frames read from the first physical unit group are represented by the frames 810(1) to 810(*p*). After performing the single-frame decoding on the frames 810(1) to 810(*p*) respectively, the UECC frame (e.g., the frame 810(*i*)) in the frames 810(1) to 810(*p*) may be recorded, as shown in FIG. 8. The memory management circuit 51 may count the total number of UECC frames in the frames 810(1) to 810(*p*) and obtain the count value N according to this total number. That is, the count value N may be equal to or reflect the total number of UECC frames in the frames 810(1) to 810(*p*).

In one exemplary embodiment, assuming that the error detecting and correcting circuit 54 performs the multi-frame encoding and decoding based on the RS code, the critical value may be set to "2". Thus, if the count value N is less than or equal to "2", the memory management circuit 51 may determine that the default condition is satisfied. Alternatively, in one exemplary embodiment, assuming that the error detecting and correcting circuit 54 performs the multi-frame encoding and decoding based on the XOR code, the critical value may be set to "1". Thus, if the count value N is equal to "1", the memory management circuit 51 may determine that the default condition is satisfied.

In one exemplary embodiment, the decoding circuit in the error detecting and correcting circuit 54 may perform the single-frame decoding (also referred to as the first single-frame decoding) on the frame (also referred to as the first data frame) read from the first physical unit to correct the error in the first data frame. In one exemplary embodiment, if the first single-frame decoding is successful, the memory management circuit 51 may output the successfully decoded data. For example, the memory management circuit 51 may transmit the successfully decoded data to the host system 11 in response to the read command. Alternatively, when performing the data consolidation operation (e.g., garbage collection operation), performing WL operation, processing read disturb, and/or processing data retention, the memory management circuit 51 may store the successfully decoded data to a specific physical unit and/or perform corresponding operations on the successfully decoded data. In one exemplary embodiment, if the first single-frame decoding fails, but the default condition is satisfied, the decoding circuit may perform the multi-frame decoding on the first data frame to correct the error in the first data frame.

In one exemplary embodiment, if the first single-frame decoding fails and the default condition is not satisfied, the memory management circuit 51 may obtain error evaluation information (also referred to as the first error evaluation information) corresponding to the first physical unit group. The first error evaluation information is related to a bit error rate of the first physical unit group. For example, the first error evaluation information may roughly reflect the total number of error bits included in the data read from the first physical unit group. Then, the decoding circuit may perform the single-frame decoding again (also referred to as the second single-frame decoding) on the first data frame based on the first error evaluation information to attempt to correct the error in the first data frame based on the first error evaluation information.

In one exemplary embodiment, the memory management circuit 51 may obtain or update reliability information based on the first error evaluation information. For example, this reliability information may include a log likelihood ratio (LLR) which may be used in the single-frame decoding. The decoding circuit may perform the second single-frame decoding on the first data frame based on this reliability information. It should be noted that the reliability information used in second single-frame decoding is dynamically obtained or updated based on the first error evaluation information. Thus, compared with the first single-frame decoding, the second single-frame decoding may have a higher decoding success rate. That is, compared with the first single-frame decoding, the second single-frame decoding has a higher probability of completely correcting the errors in the first data frame.

In one exemplary embodiment, the first error evaluation information includes an evaluation value. This evaluation value may be positively related to the overall bit error rate of the first physical unit group. For example, the higher the overall bit error rate of the first physical unit group, the greater the total number of error bits in the data read from the first physical unit group, resulting in a greater evaluation value. Alternatively, another point of view, the evaluation value may be positively related to the total number of error bits in the data read from the first physical unit group.

In one exemplary embodiment, the memory management circuit 51 may perform a logical operation on multiple frames (including the first data frame) read from the first physical unit group to obtain the first error evaluation information. For example, this logical operation may include an XOR operation. For example, after performing this logical operation, the memory management circuit 51 may obtain a data sequence that reflects the result of this logical operation. The memory management circuit 51 may count the total number of specific bits (e.g., bit "1" or "0") in the data sequence and obtain first error evaluation information according to this total number.

Figure 9:
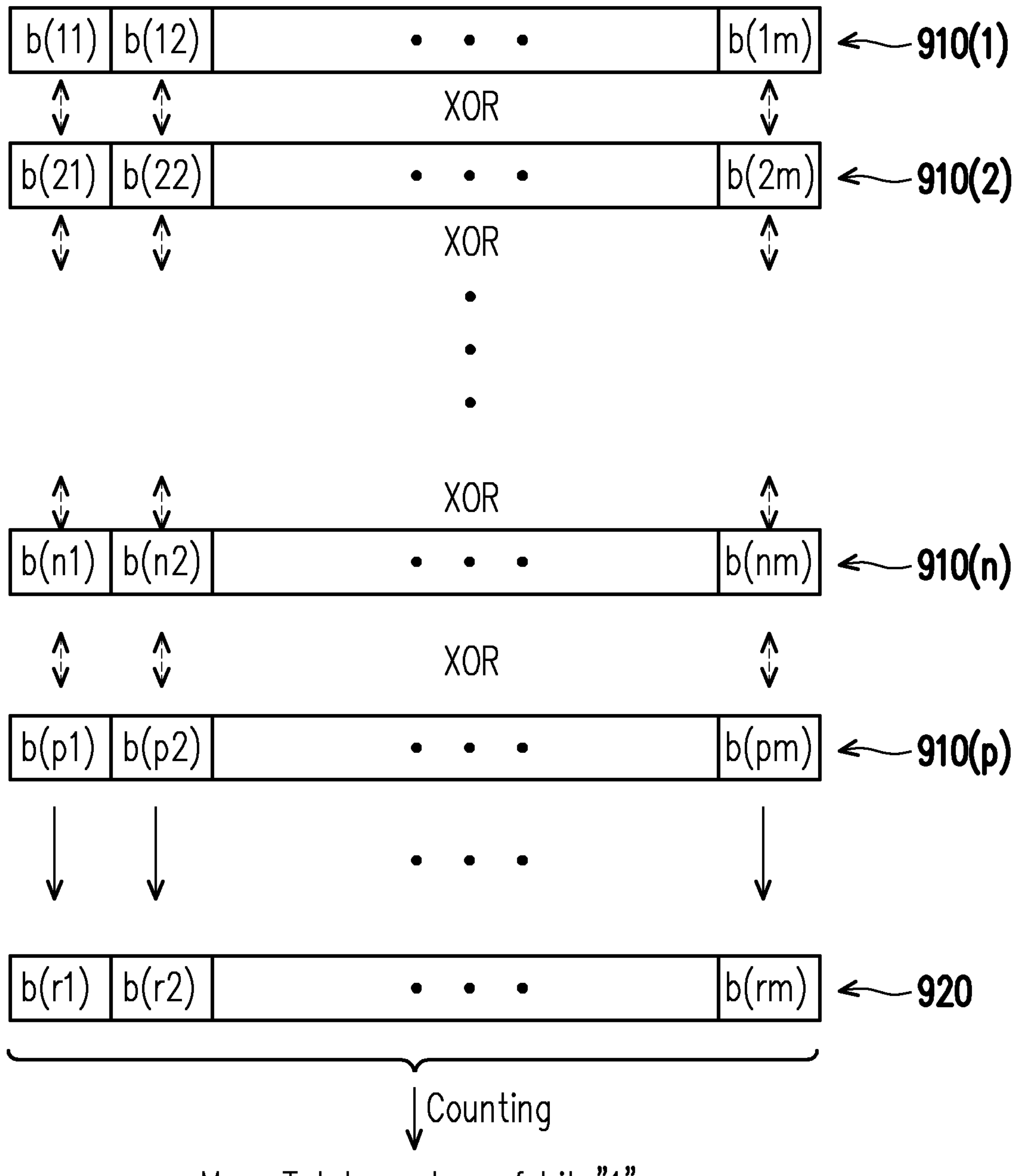
FIG. 9 is a schematic diagram of obtaining first error evaluation information according to an exemplary embodiment of the disclosure.

FIG. 9 is a schematic diagram of obtaining first error evaluation information according to an exemplary embodiment of the disclosure. Referring to FIG. 9, multiple frames read from the first physical unit group are represented by the frames 910(1) to 910(*p*). After performing the logical operation including the XOR operation on the frames 910(1) to 910(*p*), a data sequence 920 may be obtained. For example, the data sequence 920 may include bits b(r1) to b(rm). For example, the bit b(r1) reflects the result of the XOR operation of the bits b(11), b (21) . . . to b(p1); the bit b(r2) reflects the result of the XOR operation of the bits b(12), b (22) . . . to b(p2); the bit b(rm) reflects the result of the XOR operation of the bits b(1*m*), b (2*m*) . . . to b(pm); and so on. The memory management circuit 51 may count the total number of bits "1" in the data sequence 920 and obtain an evaluation value M according to this total number. For example, the evaluation value M may equal or reflect the total number of bits "1" in the data sequence 920. This evaluation value M may be positively related to the overall bit error rate of the first physical unit group. That is, the more error bits in the frames 910(1) to 910(*p*), the greater the evaluation value M. Alternatively, if there is no error bit in the frames 910(1) to 910(*p*), the evaluation value M may be zero.

Figures 10, 11:
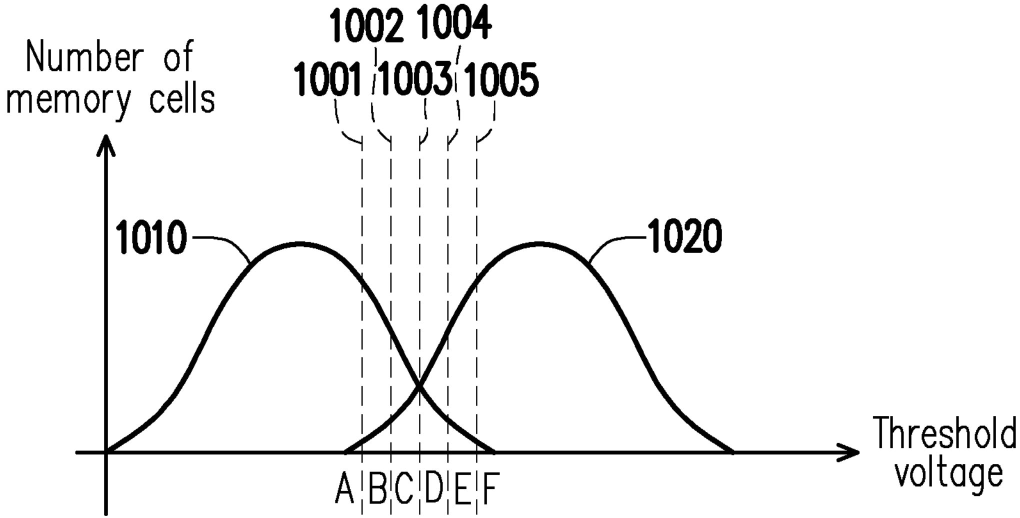
FIG. 10 is a schematic diagram of a threshold voltage distribution of memory cell according to an exemplary embodiment of the disclosure.
FIG. 11 is a schematic diagram of a reliability information table according to an exemplary embodiment of the disclosure.

FIG. 10 is a schematic diagram of a threshold voltage distribution of memory cell according to an exemplary embodiment of the disclosure. Referring to FIG. 10, it is assumed that the threshold voltage distribution of the memory cell in the first physical unit group includes statuses 1010 and 1020. The status 1010 may represent the distribution status of the threshold voltage of the memory cell used for storing the first bit (or the first bit combination) in these memory cells. The status 1020 may represent the distribution status of the threshold voltage of the memory cell used for storing the second bit (or the second bit combination) in these memory cells. For example, the first bit may be the bit "0" (or the first bit combination may be the bit "000", etc.), and the second bit may be the bit "1" (or the second bit combination may be the bit "101", etc.). In addition, the disclosure does not limit the bits or bit combinations corresponding to the status 1010 and status 1020 respectively.

In one exemplary embodiment, the memory management circuit 51 may transmit a read command sequence to the rewritable non-volatile memory module 43 to instruct the rewritable non-volatile memory module 43 to use read voltage levels 1001 to 1005 to read these memory cells. The total number of the read voltage levels 1001 to 1005 may be more or less. According to the reading results of these memory cells by the read voltage levels 1001 to 1005, the memory management circuit 51 may identify the threshold voltage of each of these memory cells as belonging to one of the voltage ranges A to F. Afterwards, assuming that the threshold voltage of a certain memory cell belongs to the voltage range A, the reliability information (e.g., LLR) corresponding to the voltage range A may be used in the single-frame decoding to decode the data bit read from this memory cell. Alternatively, assuming that the threshold voltage of a certain memory cell belongs to the voltage range C, the reliability information (e.g., LLR) corresponding to the voltage range C may be used in the single-frame decoding to decode the data bit read from this memory cell, and so on.

FIG. 11 is a schematic diagram of a reliability information table according to an exemplary embodiment of the disclosure. Referring to FIG. 11, it is assumed that table data 1101 records reliability information corresponding to different first error evaluation information. In one exemplary embodiment, if the evaluation value M=M(1) in the first error evaluation information, then according to the table data 1101, the parameter value (e.g., the LLR value) corresponding to the voltage ranges A to F in the reliability information LLR(0) may be used in the second single-frame decoding to decode the data read from the first physical unit (i.e., the first data frame). Similarly, if the evaluation value M=M(2) or M(3) in the first error evaluation information, then according to the table data 1101, the parameter value (e.g., the LLR value) corresponding to the voltage ranges A to F in the reliability information LLR(1) or LLR(2) may be used in the second single-frame decoding to decode the data read from the first physical unit (i.e., the first data frame).

In one exemplary embodiment, it is assumed that the reliability information used in the first single-frame decoding is LLR(0). After obtaining the latest evaluation value M=M(2), the reliability information used in the second single-frame decoding may be adjusted from LLR(0) to LLR(1). Afterwards, in the second single-frame decoding, the decoding circuit may decode the first data frame based on the reliability information LLR(1). Under the bit error status corresponding to the evaluation value M=M(2), compared with the reliability information LLR(0), performing the single-frame decoding based on the reliability information LLR(1) may improve the decoding success rate of the single-frame decoding. Thus, even if the first single-frame decoding fails, there is still a high probability that the first data frame may be successfully decoded in the second single-frame decoding (i.e., all errors in the first data frame are corrected). It should be noted that even if the decoding success rate of the second single-frame decoding is higher than the decoding success rate of the first single-frame decoding, the second single-frame decoding may still fail (i.e., fail to correct all errors in the first data frame).

In one exemplary embodiment, in response to the second single-frame decoding being failed, the memory management circuit 51 may transmit another read command sequence to instruct the rewritable non-volatile memory module 43 to read data from another physical unit (also referred to as the second physical unit) in the first physical unit group. This data may be included in one frame (also referred to as the second data frame), and the second data frame is also a UECC frame.

In one exemplary embodiment, assuming that the memory management circuit 51 reads data from the first physical unit according to the read command from the host system 11, the read command is not used to read the data stored in the second physical unit. For example, the reading of the first logical unit according to the read command is not mapped to the second physical unit.

In one exemplary embodiment, the decoding circuit may perform the single-frame decoding (also referred to as the third single-frame decoding) on the second data frame based on the first error evaluation information to correct the error in the second data frame. In one exemplary embodiment, the data is read from the second physical unit (i.e., the second data frame) and the third single-frame decoding is performed on the second data frame to assist in decoding the first data frame.

In one exemplary embodiment, in response to the third single-frame decoding being successful (i.e., all errors in the second data frame are corrected), the memory management circuit 51 may update the first error evaluation information according to the decoding result of the third single-frame decoding. For example, after correcting all errors in the second data frame, the memory management circuit 51 may re-obtain the first error evaluation information (e.g., recalculate the evaluation value M) based on multiple frames (including the first data frame and the corrected second data frame) read from the first physical unit group. The updated first error evaluation information may roughly reflect the latest bit error rate of multiple physical units in the first physical unit group. Then, the decoding circuit may perform the single-frame decoding again (also referred to as the fourth single-frame decoding) on the first data frame based on the updated first error evaluation information to attempt to correct the error in the first data frame based on the updated first error evaluation information. For example, the memory management circuit 51 may update the reliability information again based on the recalculated evaluation value M. In particular, compared with the evaluation value M before the update, the updated evaluation value M may be used to select more appropriate reliability information. The decoding circuit may then perform the fourth single-frame decoding based on the updated reliability information. Thus, compared with the second single-frame decoding, the fourth single-frame decoding may have higher decoding success rate.

In one exemplary embodiment, the memory management circuit 51 may obtain error evaluation information (also referred to as the second error evaluation information) corresponding to at least one candidate physical unit in the first physical unit group. For example, the candidate physical unit refers to the physical unit in which the UECC frame is stored in the first physical unit group, and the candidate physical unit does not include the first physical unit. The second error evaluation information corresponding to a certain candidate physical unit may roughly reflect the bit error rate of this candidate physical unit. For example, the memory management circuit 51 may obtain the second error evaluation information according to the information obtained in the single-frame decoding operation performed on each candidate physical unit. For example, similar to the first error evaluation information, the second error evaluation information may also include an evaluation value. This evaluation value may be positively related to the bit error rate of the corresponding candidate physical unit.

In one exemplary embodiment, the memory management circuit 51 may obtain the second error evaluation information based on the threshold voltage distribution of the memory cells in a certain candidate physical unit and/or the syndrome sum corresponding to this candidate physical unit. For example, the larger the overlapping area between multiple statuses reflected by the threshold voltage distribution of the memory cells in a certain candidate physical unit, the higher the bit error rate of this candidate physical unit may be. Alternatively, the greater the syndrome sum obtained in the single-frame decoding performed on the data read from a certain candidate physical unit, the higher the bit error rate of the candidate physical unit may be. However, the operation of evaluating the bit error rate of a physical unit based on the threshold voltage distribution of the memory cell and/or the syndrome sum is a commonly known technology and will not be further described herein.

In one exemplary embodiment, the memory management circuit 51 may determine (e.g., select) one physical unit from the candidate physical units as the second physical unit according to the second error evaluation information. For example, according to the second error evaluation information, the memory management circuit 51 may preferentially select the physical unit with the lowest or relatively low bit error rate among the candidate physical units as the second physical unit to improve the decoding success rate of the second data frame (or the third single-frame decoding). In one exemplary embodiment, if the second error evaluation information reflects that the bit error rate of a certain candidate physical unit is too high (e.g., higher than the error rate critical value), the memory management circuit 51 may skip this candidate physical unit and not select this candidate physical unit as the second physical unit.

In one exemplary embodiment, the memory management circuit 51 may sequentially set all (or at least a part) of the candidate physical units as the second physical units and perform the third single-frame decoding thereon. If the third single-frame decoding performed on a certain candidate physical unit (i.e., the second physical unit) succeeds, the memory management circuit 51 may correspondingly update the first error evaluation information and instruct the decoding circuit to perform the fourth single-frame decoding on the first data frame based on the updated first error evaluation information, until the fourth single-frame decoding succeeds and all candidate physical units to be processed have been processed or the default condition is satisfied.

In one exemplary embodiment, in response to a frame read from any physical unit in the first physical unit group being successfully decoded, the memory management circuit 51 may update the count value (e.g., count value N in FIG. 8). The updated count value may reflect the total number of latest UECC frames in the first physical unit group. In one exemplary embodiment, if the updated count value reaches the critical value, the memory management circuit 51 may determine that the default condition is satisfied and may perform the multi-frame decoding. In addition, if the updated count value has not yet reached the critical value, the memory management circuit 51 may prohibit the multi-frame decoding from being performed.

In one exemplary embodiment, in response to the second single-frame decoding being successful (i.e., all errors in the first data frame are corrected), the memory management circuit 51 may update the first error evaluation information continuously according to the decoding result of the second single-frame decoding. The updated first error evaluation information may roughly reflect the latest bit error rate of multiple physical units in the first physical unit group. Then, the memory management circuit 51 may perform the single-frame decoding (also referred to as the fifth single-frame decoding) on the data frame (also referred to as the third data frame) read from at least one physical unit (also referred to as the third physical unit) among the first physical unit group according to the updated first error evaluation information. For example, similar to the second physical unit, the third physical unit may be determined from the candidate physical units. For example, the memory management circuit 51 may preferentially select the physical unit with the lowest or relatively low bit error rate among the candidate physical units as the third physical unit to improve the decoding success rate of the third data frame (or the fifth single-frame decoding). In addition, if the bit error rate of a certain candidate physical unit is too high (e.g., higher than the error rate critical value), the memory management circuit 51 may skip this candidate physical unit and not select this candidate physical unit as the third physical unit. In this way, the total number of UECC frames in the first physical unit group may be gradually reduced.

In one exemplary embodiment, in response to the fifth single-frame decoding being successful (i.e., all errors in the third data frame are corrected), the memory management circuit 51 may transmit a write command sequence to the rewritable non-volatile memory module 43. This write command sequence may instruct the rewritable non-volatile memory module 43 to store the corrected third data frame back to at least one physical unit (also referred to as the fourth physical unit). After the corrected third data frame is stored in the fourth physical unit, the fourth physical unit may be added to the first physical unit group to replace the third physical unit that originally stored the third data frame, and the third physical unit may be removed from the first physical unit group. Similarly, in one exemplary embodiment, the corrected second data frame may also be stored in at least one physical unit (also referred to as the fifth physical unit). After the corrected second data frame is stored in the fifth physical unit, the fifth physical unit may be added to the first physical unit group to replace the second physical unit that originally stored the second data frame, and the second physical unit may be removed from the first physical unit group.

In one exemplary embodiment, when the default condition is not satisfied, by continuously updating the first error evaluation information and performing the single-frame decoding on the frame (i.e., UECC frame) read from the at least one physical unit in the first physical unit group according to the updated first error evaluation information, the decoding success rate of the single-frame decoding may be continuously improved and the total number of UECC frames in the first physical unit group may be reduced. Once the total number of UECC frames in the first physical unit group reaches the critical value, the multi-frame decoding of the first physical unit group may be started to ensure that the remaining UECC frames in the first physical unit group may be successfully decoded.

In one exemplary embodiment, the first physical unit is also referred to as the target physical unit. In one exemplary embodiment, the physical unit read in the first physical unit group to assist in decoding the first data frame (i.e., the second physical unit) and/or the physical unit read to reduce the total number of UECC frames in the first physical unit group (i.e., the third physical unit) are also referred to non-target physical units. In one exemplary embodiment, a frame read from the target physical unit is also referred to as a target data frame, and/or a frame read from the non-target physical unit is also referred to as a non-target data frame.

In one exemplary embodiment, regardless of whether the target data frame is successfully decoded, the single-frame decoding may continue to be performed on the non-target data frames belonging to the UECC frames stored in the first physical unit group, until the target data frame is successfully decoded, all UECC frames in the first physical unit group are successfully decoded, the default condition is satisfied, or the upper limit of decoding times is reached (e.g., the maximum number of iterations is reached). In addition, the corrected frame may be used to replace the frame originally stored in the first physical unit group to improve the decoding success rate of the frame in the future.

Figure 12:
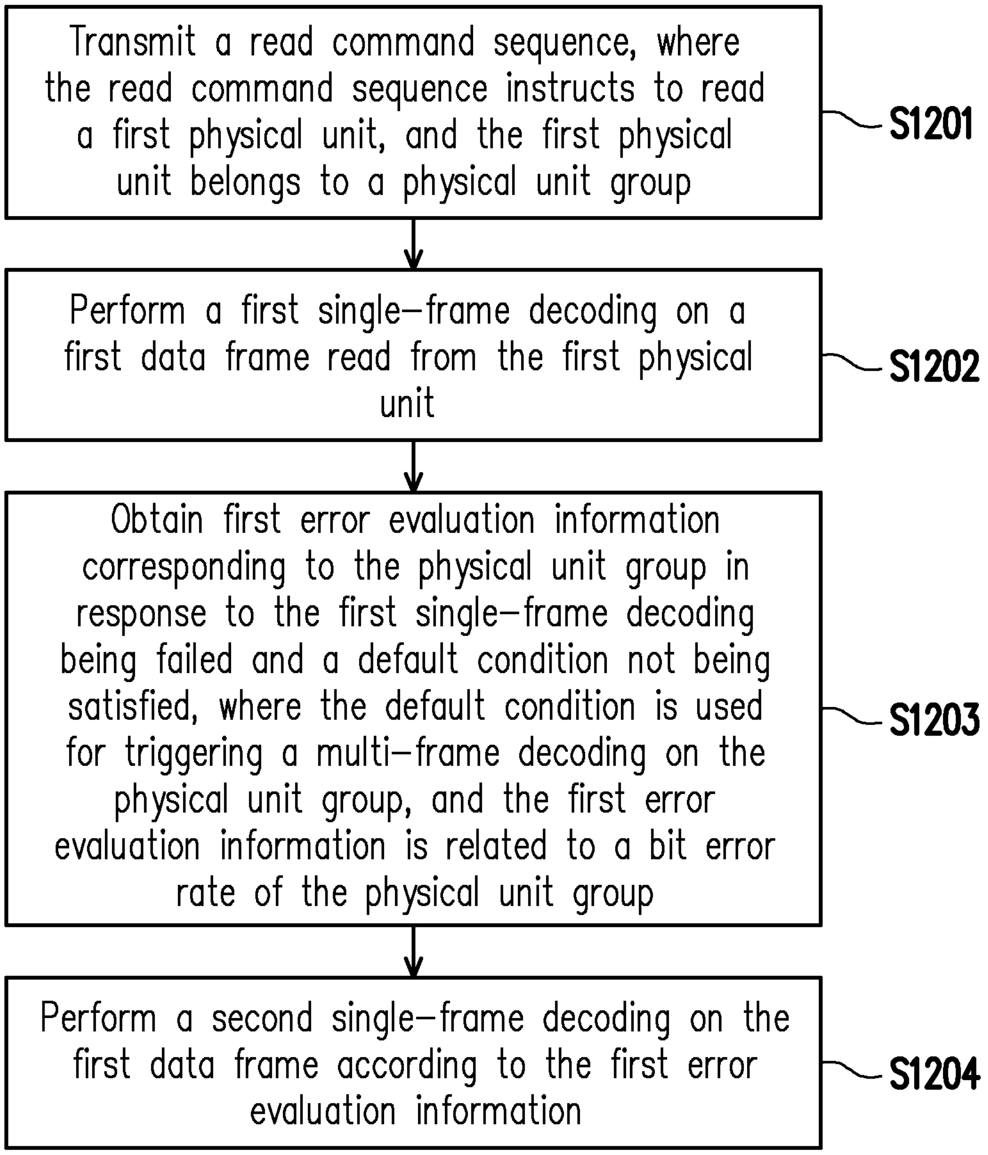
FIG. 12 is a flowchart of a decoding method according to an exemplary embodiment of the disclosure.

FIG. 12 is a flowchart of a decoding method according to an exemplary embodiment of the disclosure. Referring to FIG. 12, in step S1201, a read command sequence is transmitted. The read command sequence instructs to read a first physical unit, and the first physical unit belongs to a physical unit group. In step S1202, a first single-frame decoding is performed on a first data frame read from the first physical unit. In step S1203, first error evaluation information corresponding to the physical unit group is obtained in response to the first single-frame decoding being failed and a default condition not being satisfied. The default condition is used for triggering a multi-frame decoding on the physical unit group, and the first error evaluation information is related to a bit error rate of the physical unit group. In step S1204, a second single-frame decoding is performed on the first data frame according to the first error evaluation information.

Figure 13:
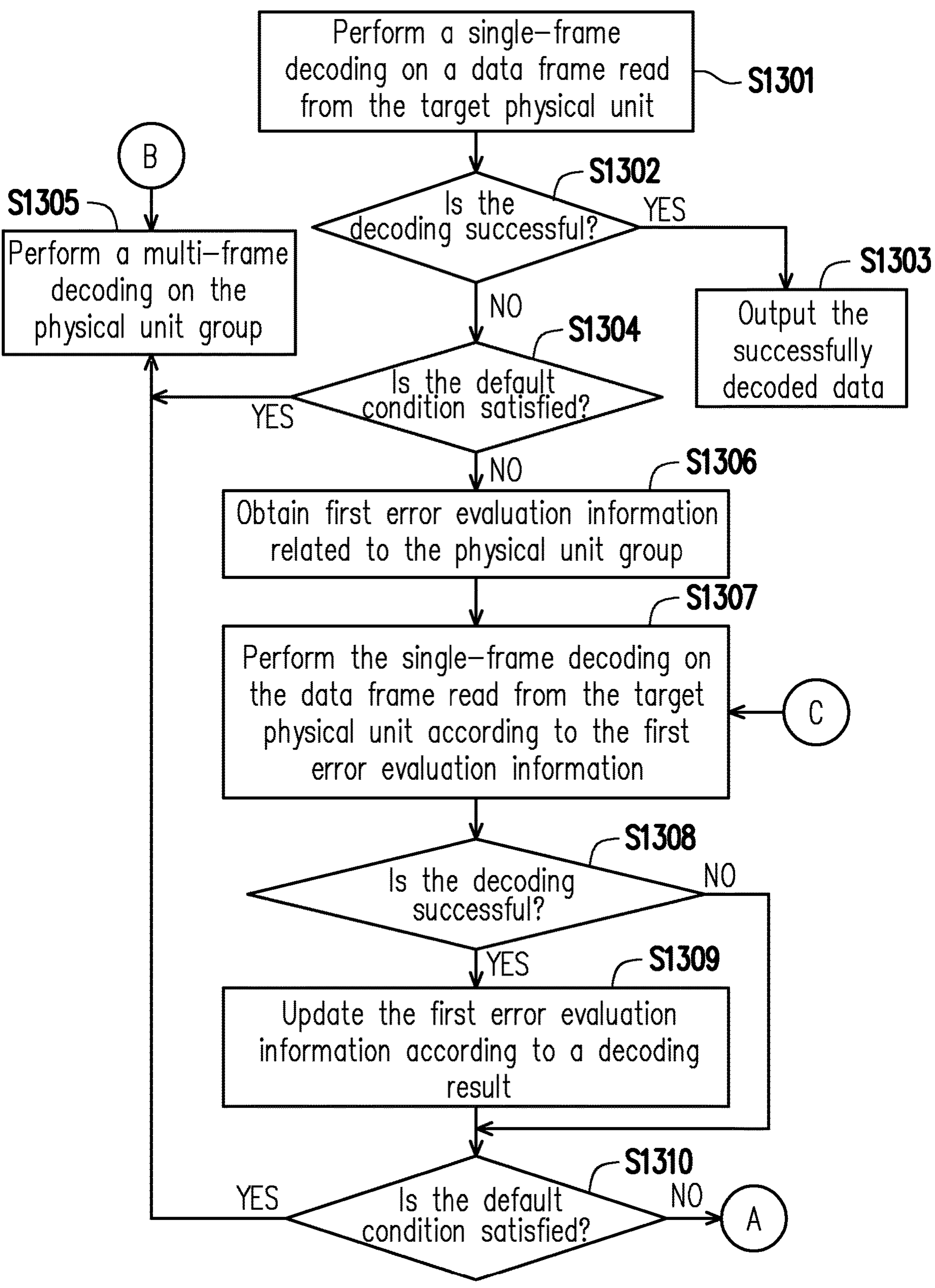
FIG. 13 and FIG. 14 are flowcharts of a decoding method according to an exemplary embodiment of the disclosure.
Figure 14:
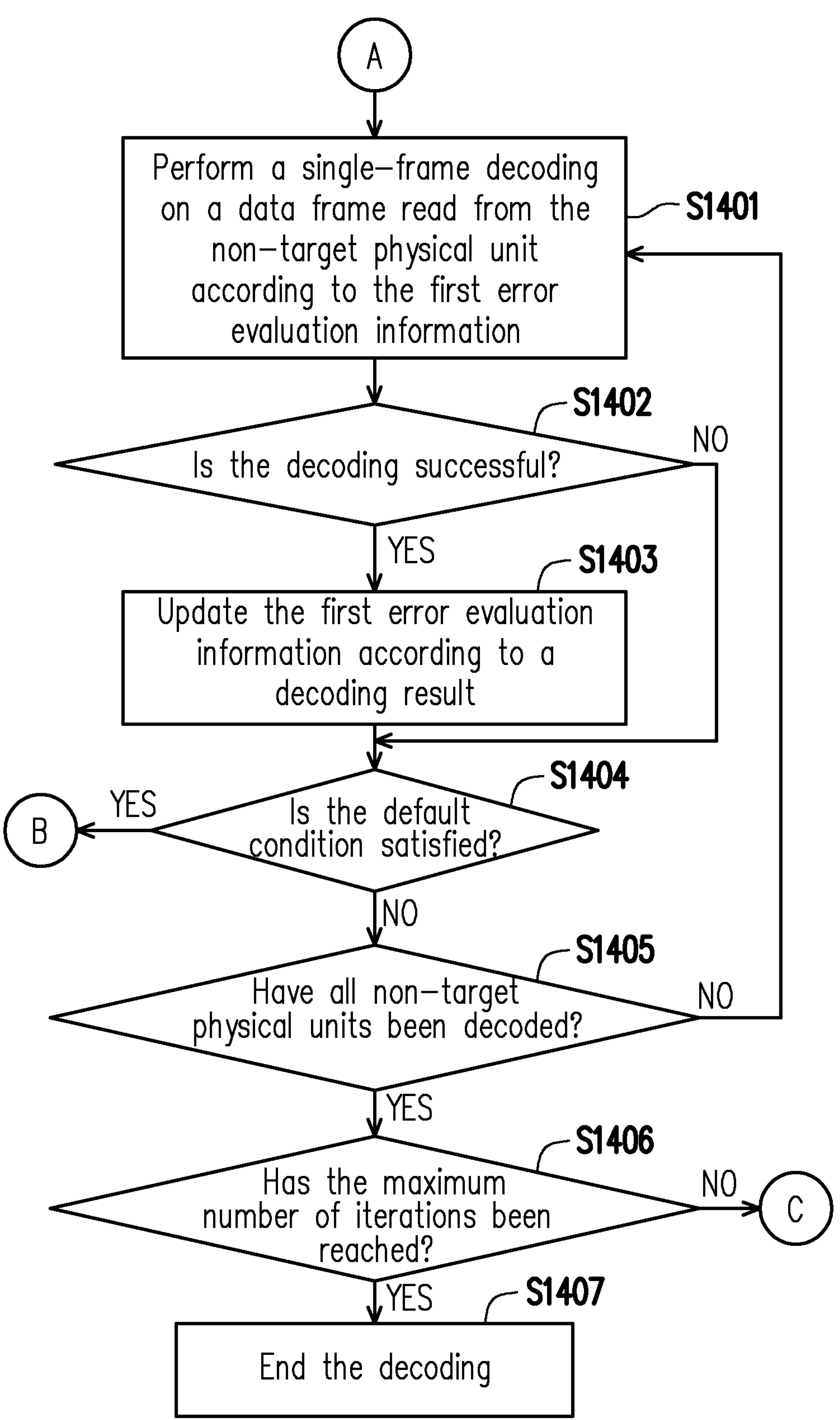

FIG. 13 and FIG. 14 are flowcharts of a decoding method according to an exemplary embodiment of the disclosure. Referring to FIG. 13, in step S1301, a single-frame decoding is performed on a data frame read from the target physical unit. For example, the target physical unit belongs to one physical unit group. In step S1302, it is determined whether this single-frame decoding is successful. If this single-frame decoding is successful, in step S1303, the successfully decoded data is output. If the single-frame decoding fails, in step S1304, it is determined whether a default condition is satisfied. If the default condition is satisfied (i.e., the total number of UECC frames in the physical unit group to which the target physical unit belongs is less than or equal to the critical value), in step S1305, a multi-frame decoding is performed on the physical unit group to which the target physical unit belongs.

On the other hand, if the default condition is not satisfied (e.g., the total number of UECC frames in the physical unit group to which the target physical unit belongs is greater than the critical value), in step S1306, first error evaluation information related to the physical unit group is obtained. In step S1307, the single-frame decoding is performed on the data frame read from the target physical unit according to the first error evaluation information. In step S1308, it is determined whether this single-frame decoding is successful. If this single-frame decoding is successful, in step S1309, the first error evaluation information is updated according to a decoding result of this single-frame decoding and the successfully decoded data may be output. Next, in step S1310, it is determined again whether the default condition is satisfied. If the default condition is satisfied, in step S1305, the multi-frame decoding is performed on the physical unit group to which the target physical unit belongs. It should be noted that in one exemplary embodiment, even if the UECC frame stored in the target physical unit has been corrected, this multi-frame decoding may be further used to correct the UECC frames in the non-target physical units in the same physical unit group, so as to complete the correction of all UECC frames in the entire physical unit group.

On the other hand, if the determination result of step S1308 is NO (i.e., this single-frame decoding fails), step S1309 may be skipped and step S1310 may be executed. In addition, if the determination result of step S1310 is NO (i.e., the default condition is not satisfied), step S1401 in FIG. 14 may be entered.

Referring to FIG. 14, in step S1401, a single-frame decoding is performed on a data frame read from the non-target physical unit according to the first error evaluation information. In step S1402, it is determined whether this single-frame decoding is successful. If this single-frame decoding is successful, in step S1403, the first error evaluation information is updated according to a decoding result of this single-frame decoding. In step S1404, it is determined again whether the default condition is satisfied. If the default condition is satisfied, it may return to step S1305 in FIG. 13, and the multi-frame decoding is performed on the physical unit group to which the target physical unit belongs. In addition, if the determination result of step S1402 is NO, step S1403 may be skipped.

On the other hand, if the determination result of step S1404 is NO (i.e., the default condition is not satisfied), in step S1405, it is determined whether all non-target physical units storing the UECC frames in the physical unit group to which the target physical unit belongs have been decoded. If there are still non-target physical units storing the UECC frames that have not been decoded, it may return to step S1401 and perform the single-frame decoding on the data frame read from this non-target physical unit according to the first error evaluation information. If all non-target physical units storing the UECC frame have been decoded, in step S1406, it is determined whether the decoding operation performed reaches the maximum number of iterations. If not (i.e., the decoding operation performed has not reached the maximum number of iterations), it may return to step S1307 in FIG. 13 to perform the single-frame decoding on the data frame read from the target physical unit according to the first error evaluation information. In addition, if the decoding operation performed has reached the maximum number of iterations, in step S1407, the decoding of this physical unit group (or target physical unit) is ended.

Nevertheless, each step in FIG. 12 to FIG. 14 has been described in detail above and will not be described again herein. It is worth noting that each step in FIG. 12 to FIG. 14 may be implemented as multiple codes or circuits, which is not limited by the disclosure. In addition, the methods in FIG. 12 to FIG. 14 may be used in conjunction with the above exemplary embodiments, or may also be used alone, which is not limited by the disclosure.

To sum up, the exemplary embodiment of the disclosure include a decoding method, a memory storage device, and a memory control circuit unit, the decoding success rate of the target data frame and/or non-target data frame in the physical unit group may be improved by continuously updating the first error evaluation information corresponding to the specific physical unit group. In addition, by alternately performing the single-frame decoding on the target data frame and non-target data frame in the same physical unit group and updating the first error evaluation information according to the decoding result, it may also increase the decoding success rate of subsequent single-frame decoding. Furthermore, by preferentially selecting non-target data frames with lower bit error rates to match the target data frames for decoding, the overall decoding efficiency of the physical unit group may also be improved.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A decoding method for a rewritable non-volatile memory module, wherein the rewritable non-volatile memory module comprises a plurality of physical units, and the decoding method comprising:

transmitting a read command sequence, wherein the read command sequence instructs to read a first physical unit in the physical units, and the first physical unit belongs to a physical unit group;

performing a first single-frame decoding on a first data frame read from the first physical unit;

obtaining first error evaluation information corresponding to the physical unit group in response to the first single-frame decoding being failed, wherein the first error evaluation information comprises an evaluation value which is obtained based on a logical operation performed on multiple data frames read respectively from multiple physical units in the physical unit group; and performing a second single-frame decoding on the first data frame read from the first physical unit which is one single physical unit among the physical units according to the first error evaluation information.

2. The decoding method according to claim 1, further comprising:

performing a third single-frame decoding on a second data frame read from a second physical unit in the physical units according to the first error evaluation information in response to the second single-frame decoding being failed, wherein the second physical unit belongs to the physical unit group;

updating the first error evaluation information according to a decoding result of the third single-frame decoding in response to the third single-frame decoding being successful; and performing a fourth single-frame decoding on the first data frame according to the updated first error evaluation information.

3. The decoding method according to claim 2, wherein the first physical unit belongs to a target physical unit, and the second physical unit belongs to a non-target physical unit for assisting in decoding of the first data frame.

4. The decoding method according to claim 2, further comprising:

obtaining second error evaluation information corresponding to at least one candidate physical unit in the physical unit group, wherein the at least one candidate physical unit does not include the first physical unit; and determining the second physical unit from the at least one candidate physical unit according to the second error evaluation information.

5. The decoding method according to claim 1, further comprising:

updating the first error evaluation information according to a decoding result of the second single-frame decoding in response to the second single-frame decoding being successful; and performing a fifth single-frame decoding on a third data frame read from a third physical unit in the physical units according to the updated first error evaluation information, wherein the third physical unit belongs to the physical unit group.

6. The decoding method according to claim 5, wherein the first physical unit belongs to a target physical unit, and the third physical unit belongs to a non-target physical unit for reducing a total number of UECC frames in the physical unit group.

7. The decoding method according to claim 5, further comprising:

storing corrected third data frame in a fourth physical unit in the physical units in response to the fifth single-frame decoding being successful;

adding the fourth physical unit to the physical unit group; and removing the third physical unit from the physical unit group.

8. The decoding method according to claim 1, further comprising:

updating a count value in response to a data frame read from any one of the physical units in the physical unit group being successfully decoded;

determining that a default condition is satisfied in response to the count value reaching a critical value; and performing a multi-frame decoding in response to the default condition being satisfied.

9. A memory storage device, comprising:

a connection interface unit, used for coupling to a host system;

a rewritable non-volatile memory module, wherein the rewritable non-volatile memory module comprises a plurality of physical units; and a memory control circuit unit, coupled to the connection interface unit and the rewritable non-volatile memory module, wherein the memory control circuit unit is used for:

transmitting a read command sequence, wherein the read command sequence instructs to read a first physical unit in the physical units, and the first physical unit belongs to a physical unit group;

performing a first single-frame decoding on a first data frame read from the first physical unit;

obtaining first error evaluation information corresponding to the physical unit group in response to the first single-frame decoding being failed, wherein the first error evaluation information comprises an evaluation value which is obtained based on a logical operation performed on multiple data frames read respectively from multiple physical units in the physical unit group; and performing a second single-frame decoding on the first data frame read from the first physical unit which is one single physical unit among the physical units according to the first error evaluation information.

10. The memory storage device according to claim 9, wherein the memory control circuit unit is further used for:

performing a third single-frame decoding on a second data frame read from a second physical unit in the physical units according to the first error evaluation information in response to the second single-frame decoding being failed, wherein the second physical unit belongs to the physical unit group;

updating the first error evaluation information according to a decoding result of the third single-frame decoding in response to the third single-frame decoding being successful; and performing a fourth single-frame decoding on the first data frame according to the updated first error evaluation information.

11. The memory storage device according to claim 10, wherein the first physical unit belongs to a target physical unit, and the second physical unit belongs to a non-target physical unit for assisting in decoding of the first data frame.

12. The memory storage device according to claim 10, wherein the memory control circuit unit is further used for:

obtaining second error evaluation information corresponding to at least one candidate physical unit in the physical unit group, wherein the at least one candidate physical unit does not include the first physical unit; and determining the second physical unit from the at least one candidate physical unit according to the second error evaluation information.

13. The memory storage device according to claim 9, wherein the memory control circuit unit is further used for:

updating the first error evaluation information according to a decoding result of the second single-frame decoding in response to the second single-frame decoding being successful; and performing a fifth single-frame decoding on a third data frame read from a third physical unit in the physical units according to the updated first error evaluation information, wherein the third physical unit belongs to the physical unit group.

14. The memory storage device according to claim 13, wherein the first physical unit belongs to a target physical unit, and the third physical unit belongs to a non-target physical unit for reducing a total number of UECC frames in the physical unit group.

15. The memory storage device according to claim 13, wherein the memory control circuit unit is further used for:

instructing to store corrected third data frame in a fourth physical unit in the physical units in response to the fifth single-frame decoding being successful;

adding the fourth physical unit to the physical unit group; and removing the third physical unit from the physical unit group.

16. The memory storage device according to claim 9, wherein the memory control circuit unit is further used for:

updating a count value in response to a data frame read from any one of the physical units in the physical unit group being successfully decoded; and determining that a default condition is satisfied in response to the count value reaching a critical value; and performing a multi-frame decoding in response to the default condition being satisfied.

17. A memory control circuit unit for controlling a rewritable non-volatile memory module, wherein the rewritable non-volatile memory module comprises a plurality of physical units, and the memory control circuit unit comprises:

a host interface, used for coupling to a host system;

a memory interface, used for coupling to the rewritable non-volatile memory module;

a decoding circuit; and a memory management circuit, coupled to the host interface, the memory interface, and the decoding circuit, wherein the memory management circuit is used for transmitting a read command sequence, wherein the read command sequence instructs to read a first physical unit in the physical units, and the first physical unit belongs to a physical unit group, the decoding circuit is used for performing a first single-frame decoding on a first data frame read from the first physical unit, the memory management circuit is further used for obtaining first error evaluation information corresponding to the physical unit group in response to the first single-frame decoding being failed, wherein the first error evaluation information comprises an evaluation value which is obtained based on a logical operation performed on multiple data frames read respectively from multiple physical units in the physical unit group, and the decoding circuit is further used for performing a second single-frame decoding on the first data frame read from the first physical unit which is one single physical unit among the physical units according to the first error evaluation information.

18. The memory control circuit unit according to claim 17, wherein the decoding circuit is further used for performing a third single-frame decoding on a second data frame read from a second physical unit in the physical units according to the first error evaluation information in response to the second single-frame decoding being failed, wherein the second physical unit belongs to the physical unit group, the memory management circuit is further used for updating the first error evaluation information according to a decoding result of the third single-frame decoding in response to the third single-frame decoding being successful, and the decoding circuit is further used for performing a fourth single-frame decoding on the first data frame according to the updated first error evaluation information.

19. The memory control circuit unit according to claim 18, wherein the first physical unit belongs to a target physical unit, and the second physical unit belongs to a non-target physical unit for assisting in decoding of the first data frame.

20. The memory control circuit unit according to claim 18, wherein the memory management circuit is further used for:

obtaining second error evaluation information corresponding to at least one candidate physical unit in the physical unit group, wherein the at least one candidate physical unit does not include the first physical unit; and determining the second physical unit from the at least one candidate physical unit according to the second error evaluation information.

21. The memory control circuit unit according to claim 17, wherein the memory management circuit is further used for: updating the first error evaluation information according to a decoding result of the second single-frame decoding in response to the second single-frame decoding being successful, and the decoding circuit is further used for performing a fifth single-frame decoding on a third data frame read from a third physical unit in the physical units according to the updated first error evaluation information, wherein the third physical unit belongs to the physical unit group.

22. The memory control circuit unit according to claim 21, wherein the first physical unit belongs to a target physical unit, and the third physical unit belongs to a non-target physical unit for reducing a total number of UECC frames in the physical unit group.

23. The memory control circuit unit according to claim 21, wherein the memory management circuit is further used for:

instructing to store corrected third data frame in a fourth physical unit in the physical units in response to the fifth single-frame decoding being successful;

adding the fourth physical unit to the physical unit group; and removing the third physical unit from the physical unit group.

24. The memory control circuit unit according to claim 17, wherein the memory management circuit is further used for:

updating a count value in response to a data frame read from any one of the physical units in the physical unit group being successfully decoded; and determining that a default condition is satisfied in response to the count value reaching a critical value; and instructing the decoding circuit to perform a multi-frame decoding in response to the default condition being satisfied.

* * * * *